United States Patent [19]

Cody

[11] Patent Number: 4,754,838

[45] Date of Patent: Jul. 5, 1988

[54] ELECTRONIC IGNITION BY-PASS SYSTEM

[76] Inventor: Jeffrey P. Cody, 1823 Birch Lake Ave., White Bear Lake, Minn. 55110

[21] Appl. No.: 942,519

[22] Filed: Dec. 15, 1986

[51] Int. Cl.$^4$ .............................................. B60R 25/08
[52] U.S. Cl. ................................. 180/287; 307/10 AT
[58] Field of Search ............................... 180/287, 271; 307/10 AT

[56] References Cited

U.S. PATENT DOCUMENTS

| | | | |
|---|---|---|---|
| 1,730,526 | 10/1929 | Pancoast | 180/287 |
| 3,414,734 | 12/1968 | Konrad | 180/287 |
| 3,850,260 | 11/1974 | Obermeit | 180/287 |
| 4,545,459 | 10/1985 | Rochman | 180/287 |

FOREIGN PATENT DOCUMENTS

| | | | |
|---|---|---|---|
| 180349 | 10/1983 | Japan | 180/287 |
| 180351 | 10/1983 | Japan | 180/287 |

Primary Examiner—Ross Weaver
Attorney, Agent, or Firm—Thomas B. Tate

[57] ABSTRACT

The invention is an electronic ignition by-pass system for an automobile or other motor vehicle which enables the vehicle's engine to be left running while the vehicle is parked but prevents the vehicle from being driven unless the ignition key is inserted. The system comprises a control box having an on-momentary on-off switch and a plurality of wires connected to various components of the vehicle's electrical system.

2 Claims, 2 Drawing Sheets

# ELECTRONIC IGNITION BY-PASS SYSTEM

SUMMARY AND BACKGROUND OF THE INVENTION

The invention is an electronic ignition by-pass system which can be installed in any automatic or manual transmission vehicle which has a 12 volt (preferably will work for 8-14 volts) negative ground electrical system, including personal and police cars, ambulances, taxicabs, busses, and trucks.

The primary object of the invention is to enable the vehicle operator to remove the ignition key and exit the vehicle while leaving the engine running and other accessories such as radio, emergency lights, air conditioner or heater, and life support systems operational, while at the same time minimizing the risk of theft of the unoccupied vehicle. The threat of theft is minimized because the engine stops automatically if an intruder attempts to move the shift lever or apply the brakes. The vehicle cannot be driven or restarted without inserting the ignition key.

DESCRIPTION OF THE PREFERRED EMBODIMENT OF THE INVENTION:

The invention is an electronic ignition by-pass system for motor vehicles. The system includes a control box 11 which can be mounted on the bottom of the dashboard of the vehicle. The control box 11 has a switch 12 (having three position—on, momentary on, and off) and lights 14 on its front surface, and has a plurality of wires leading from its back surface to various parts of the vehicle's electrical system, as hereinafter described.

Figure 1:
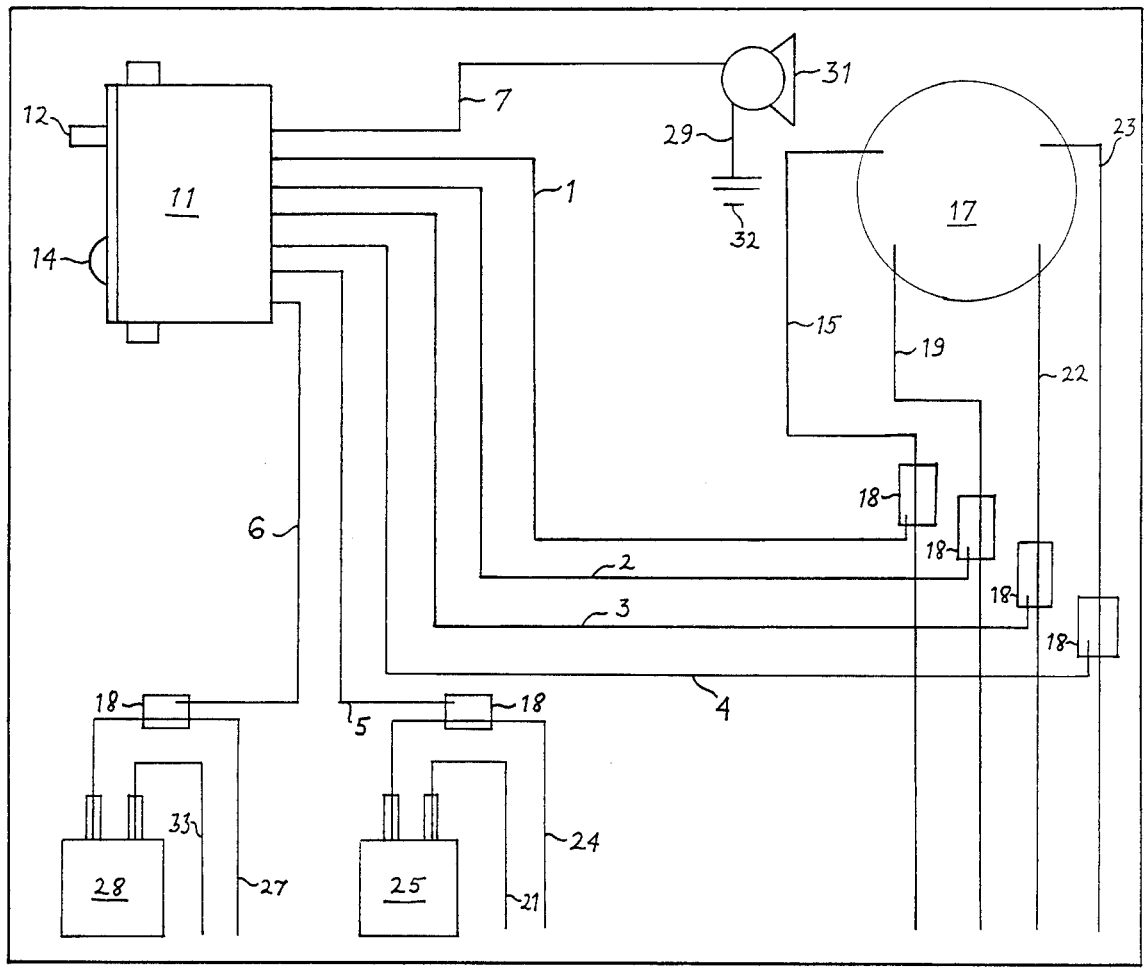
FIG. 1 is an installation wiring diagram.

The installation of the control box 11 is performed in the following manner, with reference to the installation diagram (FIG. 1).

(1) The red wire 1 is attached to the battery wire 15 which goes to the ignition switch 17, using a connector 18. This connection supplies power from the ignition to the control box 11.

(2) The yellow wire 2 is attached to the ignition wire 19 coming from the ignition switch 17, using a connector 18. This connection supplies power to the ignition system.

(3) The black wires 3 and 4 are attached to the accessory wires 22 and 23 coming from the ignition switch 17, using connectors 18. These connections supply power to the accessory circuits. In most cars, there are two accessory circuits—one for the blower motor and one for the A/C clutch. If the car has only one accessory circuit, both black wires 3 and 4 are attached to that circuit.

(4) The green wire 5 is attached to the cold side 24 of the back-up light switch 25 (the switch 25 also has a hot side 21), using a connector 18. This connection provides a ground for the control box 11 when the shift lever is in park. Ground is broken and the control box 11 is deactivated when the shift lever is put into reverse on the way to drive. If the vehicle has a manual transmission, the green wire 5 is attached to the switch side of the hand brake warning light, using a connector. This connection provides a ground for the control box 11 when the emergency brake is set.

(5) The orange wire 6 is attached to the cold side 27 of the brake light switch 28 (the switch 28 also has a hot side 33) using a connector 18. The function of this connection is to deactivate the control box 11 when the brake pedal is depressed.

(6) The gray wire 7 is attached to the horn wire 29 between the horn 31 and the horn relay 32 using a connector. The connection supplies power to and sounds the horn 31 if the control box 11 is deactivated and the switch 12 is in the up(alarm)position.

To operate the ignition by-pass system, the following procedure is used. The switch 12 is pushed down to activate the control box 11, then is pushed up to set the alarm. The ignition key is then removed. The vehicle can now be left running but cannot be driven without the ignition key. When the vehicle owner returns and wishes to drive the vehicle, he pushes the switch 12 down, then inserts the ignition key and turns it to the run position. The control box 11 will automatically deactivate.

Figure 2:
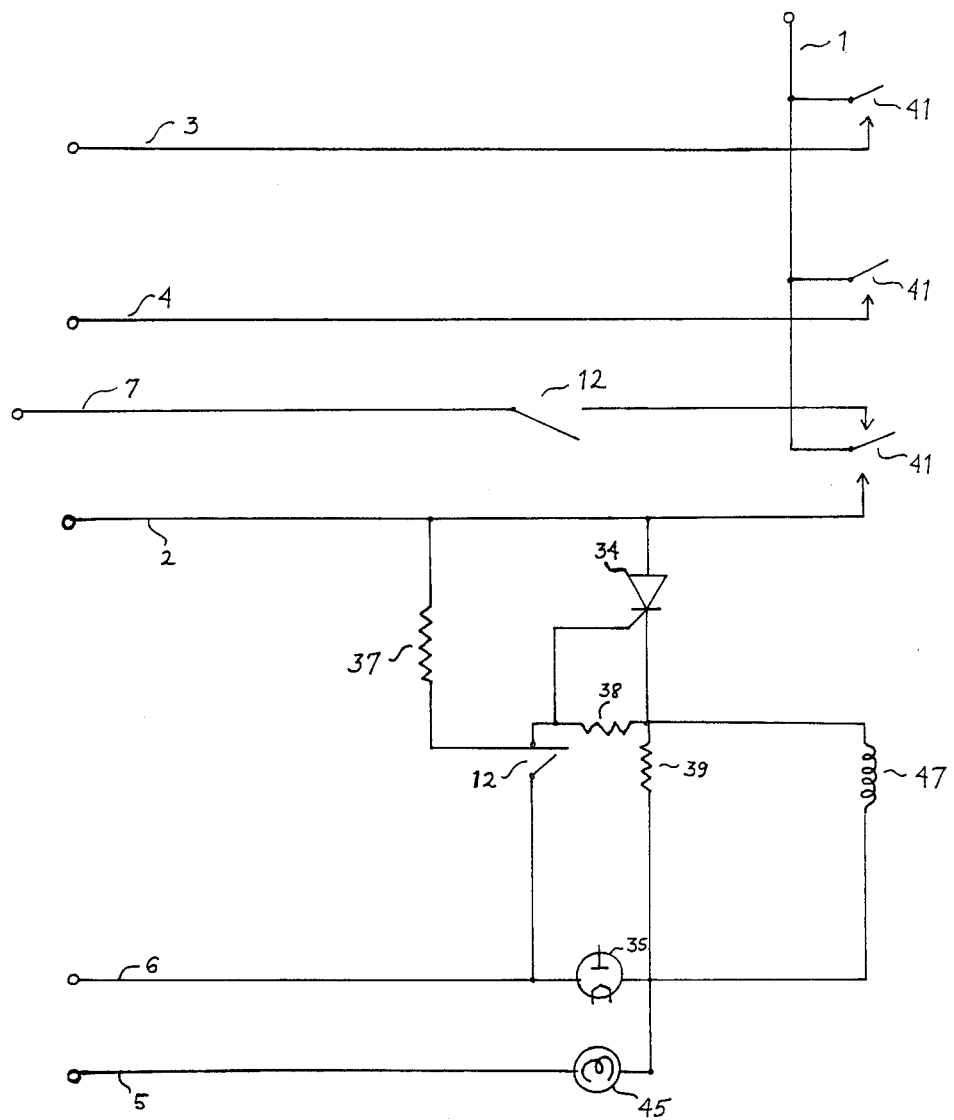
FIG. 2 is a schematic wiring diagram of the components inside the control box.

The wiring of the components inside the control box 11 is shown in FIG. 2. These components include a double-pole relay 41 having contact points at its top and bottom (three contact points altogether), a silicon control resistor 34 (having a capacitance of 106 faradays), a coil 47, a 330 ohm resistor 37, two 220 ohm resistors 38 and 39, a diode 35, and a lamp 45 which acts as a variable resistor. The switch 12 is a single switch having three positions—on (as shown attached to orange wire 6), momentary on (as shown attached ultimately to yellow wire 2), and off (as shown attached to gray wire 7).

When the ignition is on, current flows through the yellow wire 2. When the switch 12 is thrown into the momentary on position, this momentarilt completes the circuit. The silicon control resistor 34 locks the relay 41 by triggering the coil 47 which closes the relay 41. The relay 41 then takes over the function of the ignition key (this feature is what makes the invention an ignition by-pass system). The relay 41 is now supplying power to the ignition and to the accessory systems, and the ignition key can be removed at this time.

A ground is formed at the point where the green wire 5 is connected to the control box 11. The ground can be broken in either of two ways: (1) by taking the ground away when the back-up light switch 25 is activated, or (2) by changing the polarity from negative to positive, so that the two positives cancel out and thus break the ground. This is the function of the orange wire 6. When the orange wire 6 "sees" voltage running through itself (the diode 35 allows the orange wire 6 to see voltage from one direction) to the light bulb 45 which is being used as a variable resistor, the ground is discontinued. This can occur because this circuit has zero resistance when the lamp 45 is off.

If a siren or other sounding device is used, it is installed on the gray wire 7. When the coil 47 collapses due to breaking ground or seeing voltage (as for example, when the brakes are applied), power is fed through the upper contact points of the relay 41 through the switch 12, then through the gray wire 7 to the sounding device.

I claim:

1. An electronic ignition by-pass system for a motor vehicle which allows said vehicle's engine to be left running while said vehicle is parked but prevents said vehicle from being driven without the ignition key, said system comprising:

a control box having switch means for activating said system, said switch having on, momentary on, and off positions;

and a plurality of wires connecting said control box to various components of said vehicle's electrical system, said wires including:

a first wire connected to the battery wire leading to the ignition switch to supply power to said by-pass system;

a second wire connected to the ignition wire leading from said ignition switch to supply power to said vehicle's ignition system;

third and fourth wires connected to the accessory wires leading from said ignition switch to supply power to said vehicle's accessory circuits;

a fifth wire connected to the cold side of the back-up light switch, thus providing a ground while the shift lever is in park and allowing said ground to be broken and said by-pass system to be deactivated when said shift lever is put into reverse;

a sixth wire connected to the cold side of the brake light switch to deactivate said by-pass system when said vehicle's brake pedal is depressed;

a seventh wire connected to the horn wire between the horn and the horn relay to sound a sounding device if said by-pass system is deactivated while said switch is in the momentary on position.

2. An electronic ignition by-pass system as described in claim 1, wherein said fifth wire is instead connected to the switch side of the hand brake warning light, thus providing a ground when the emergency brake is set on a vehicle having a manual transmission.

* * * * *